(12) United States Patent
Oda et al.

(10) Patent No.: US 9,421,645 B2
(45) Date of Patent: Aug. 23, 2016

(54) SOLDER JOINT MATERIAL AND METHOD OF MANUFACTURING THE SAME

(71) Applicant: Hitachi Metals, Ltd., Tokyo (JP)

(72) Inventors: Yuichi Oda, Ibaraki (JP); Hideyuki Sagawa, Naka-gun (JP); Kazuma Kuroki, Hitachinaka (JP); Hiromitsu Kuroda, Hitachi (JP); Kotaro Tanaka, Naka-gun (JP); Hiroaki Numata, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 2 days.

(21) Appl. No.: 14/495,977

(22) Filed: Sep. 25, 2014

(65) Prior Publication Data
US 2015/0151385 A1 Jun. 4, 2015

(30) Foreign Application Priority Data
Nov. 29, 2013 (JP) ................. 2013-248018

(51) Int. Cl.
| | |
|---|---|
| *B32B 15/00* | (2006.01) |
| *B23K 35/00* | (2006.01) |
| *B23K 1/20* | (2006.01) |
| *B23K 35/28* | (2006.01) |
| *B23K 35/30* | (2006.01) |
| *B23K 35/02* | (2006.01) |
| *B32B 15/01* | (2006.01) |
| *B23K 1/00* | (2006.01) |
| *B23K 1/008* | (2006.01) |
| *C25D 5/50* | (2006.01) |
| *C25D 7/06* | (2006.01) |

(52) U.S. Cl.
CPC ............... *B23K 35/002* (2013.01); *B23K 1/008* (2013.01); *B23K 1/0016* (2013.01); *B23K 1/20* (2013.01); *B23K 35/00* (2013.01); *B23K 35/007* (2013.01); *B23K 35/0222* (2013.01); *B23K 35/0227* (2013.01); *B23K 35/0238* (2013.01); *B23K 35/28* (2013.01); *B23K 35/282* (2013.01); *B23K 35/286* (2013.01); *B23K 35/30* (2013.01); *B23K 35/302* (2013.01); *B32B 15/017* (2013.01); *C25D 5/50* (2013.01); *B23K 2201/42* (2013.01); *B32B 2307/702* (2013.01); *C25D 7/0607* (2013.01); *C25D 7/0614* (2013.01); *Y10T 428/1266* (2015.01)

(58) Field of Classification Search
None
See application file for complete search history.

(56) References Cited

U.S. PATENT DOCUMENTS

| | | | | |
|---|---|---|---|---|
| 3,729,294 A | * | 4/1973 | Hibbs, Jr. .................... | 428/626 |
| 2013/0256390 A1 | | 10/2013 | Yamaguchi et al. | |

FOREIGN PATENT DOCUMENTS

| | | | |
|---|---|---|---|
| JP | 62-040361 | * | 2/1987 |
| WO | WO2012029470 | * | 3/2012 |

* cited by examiner

*Primary Examiner* — Daniel J Schleis
(74) *Attorney, Agent, or Firm* — Roberts Mlotkowski Safran Cole & Calderon (57) ABSTRACT

A solder joint material includes a Zn-based metal material including mainly of Zn, an Al-based metal material including mainly of Al and provided on the Zn-based metal material, a Cu-based metal material including mainly of Cu and provided on the Al-based metal material, and a surface-treated layer provided on the Cu-based metal material and including an amorphous layer including oxygen and a metal with a higher oxygen affinity than a copper.

30 Claims, 4 Drawing Sheets

FIG.1

10 PLATE-SHAPED SOLDER JOINT MATERIAL

- 4
- 3 Cu SHEET
- 2 Al SHEET
- 1 Zn SHEET
- 2
- 3
- 4

4 SURFACE-TREATED LAYER

FIG.2

20 PLATE-SHAPED SOLDER JOINT MATERIAL

- 7 } 5
- 6
- 3 Cu SHEET
- 2 Al SHEET
- 1 Zn SHEET
- 2
- 3
- 6 } 5
- 7

5 SURFACE-TREATED LAYER
6 DIFFUSION LAYER
7 AMORPHOUS LAYER

FIG.3

30 WIRE-SHAPED SOLDER JOINT MATERIAL
14
13 Cu LAYER
12 Al LAYER
11 Zn WIRE

14 SURFACE-TREATED LAYER

FIG.4

40 WIRE-SHAPED SOLDER JOINT MATERIAL
16
17 } 15 SURFACE-TREATED LAYER
13 Cu LAYER
12 Al LAYER
11 Zn WIRE

16 DIFFUSION LAYER
17 AMORPHOUS LAYER

SOLDER JOINT MATERIAL AND METHOD OF MANUFACTURING THE SAME

The present application is based on Japanese patent application No. 2013-248018 filed on Nov. 29, 2013, the entire contents of which are incorporated herein by reference.

BACKGROUND OF THE INVENTION

1. Field of the Invention

The invention relates to a solder joint material and a method of manufacturing the solder joint material.

2. Description of the Related Art

Lead is conventionally contained in solder which is a joint material used for electrically joining components of electric/electronic equipments. According to an increase in environmental awareness, however, a move to restrict the use of lead, of which toxicity to human body has been identified, has spread especially in Europe since around 2003, and Pb-free alternative materials not containing lead have been developed.

The solder is classified into three types, high-, mid- and low-temperature solders, according to the melting temperature. Of those, mid- and low-temperature Pb-free solders have been already put to practical use but there is no high-temperature Pb-free solder which satisfies all market demands (heat resistance at 260° C., high thermal conduction, joint reliability and low cost).

In response to the demand for development of high-temperature Pb-free solders which satisfy all market demands, a Pb-free joint material disclosed in JP-A-2012-71347 was developed.

SUMMARY OF THE INVENTION

The Pb-free joint material disclosed in JP-A-2012-71347 has excellent characteristics. However, when Cu is used for the outermost layer, a Cu oxide film grows on a surface during storage. Presence of Cu oxide film inhibits wetting at the time of soldering and causes resulting deterioration in bondability. For this reason, it is required to solder preferably in an atmosphere (with hydrogen or formic acid etc.) which reduces the Cu oxide film, and there is thus room for improvement in workability during the joining.

It is an object of the invention to provide a high-temperature Pb-free solder joint material that does not need the atmosphere for reducing the Cu oxide film during the joining.

(1) According to one embodiment of the invention, a solder joint material comprises:
  a Zn-based metal material comprising mainly of Zn;
  an Al-based metal material comprising mainly of Al and provided on the Zn-based metal material;
  a Cu-based metal material comprising mainly of Cu and provided on the Al-based metal material; and
  a surface-treated layer provided on the Cu-based metal material and comprising an amorphous layer comprising oxygen and a metal with a higher oxygen affinity than a copper.

In the above embodiment (1) of the invention, the following modifications and changes can be made.

(i) The solder joint material is plate-shaped, and wherein the Al-based metal material, the Cu-based metal material and the surface-treated layer are provided on one side or both sides of the Zn-based metal material.

(ii) The solder joint material is wire-shaped, and wherein the Al-based metal material covers an outer periphery of the Zn-based metal material, the Cu-based metal material covers an outer periphery of the Al-based metal material and the surface-treated layer covers an outer periphery of the Cu-based metal material.

(iii) The amorphous layer further comprises a copper diffused from the Cu-based metal material.

(iv) The surface-treated layer further comprises a diffusion layer under the amorphous layer, and wherein the diffusion layer comprises a copper and a metal with a higher oxygen affinity than the copper, or oxygen, a copper and a metal with a higher oxygen affinity than the copper.

(v) The metal with a higher oxygen affinity than copper comprises zinc.

(vi) The surface-treated layer has a thickness of not less than 3 nm and not more than 100 nm.

(2) According to another embodiment of the invention, a method of manufacturing a solder joint material comprises:
  forming an Al-based metal material comprising mainly of Al on a Zn-based metal material comprising mainly of Zn;
  forming a Cu-based metal material comprising mainly of Cu on the Al-based metal material; and
  forming on a surface of the Cu-based metal material a surface-treated layer comprising a metal with a higher oxygen affinity than a copper and then heat-treating the formed layer at a temperature of not less than 30° C. and not more than 300° C. for not less than 5 seconds and not more than 60 minutes.

In the above embodiment (2) of the invention, the following modifications and changes can be made.

(vii) The metal with a higher oxygen affinity than copper comprises zinc.

(viii) The surface-treated layer has a thickness of not less than 3 nm and not more than 100 nm.

Effects of the Invention

According to one embodiment of the invention, a high-temperature Pb-free solder joint material can be provided that does not need the atmosphere for reducing the Cu oxide film during the joining.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Configuration of Solder Joint Material

Solder joint materials in the embodiments of the invention are provided with a Zn-based metal material containing mainly of Zn; an Al-based metal material containing mainly of Al and provided on the Zn-based metal material; a Cu-based metal material containing mainly of Cu and provided on the Al-based metal material; and a surface-treated layer which is provided on the Cu-based metal material and has an amorphous layer containing oxygen and a metal with a higher oxygen affinity than copper. It is mainly embodied in the plate form and the wire form, and plate-shaped solder joint materials (first and second embodiments) and wire-shaped solder joint materials (third and fourth embodiments) will be respectively described below.

First and Second Embodiments

Solder joint materials in the first and second embodiments of the invention have a plate-like shape in which the Al-based metal material, the Cu-based metal material and the surface-treated layer are sequentially provided on each of a pair of opposing sides of the Zn-based metal material which has a rectangular cross section. The materials and layer here are provided on both sides of the Zn-based metal material but it is not limited thereto. The Al-based metal material, the Cu-based metal material and the surface-treated layer may be sequentially provided on only one side of the Zn-based metal material.

Figure 1:
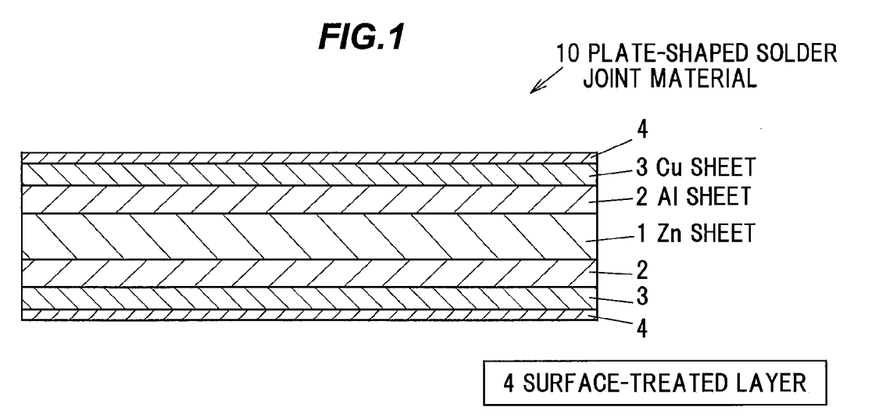
FIG. 1 is a schematic cross sectional view showing a solder joint material in a first embodiment of the present invention.
Figure 2:
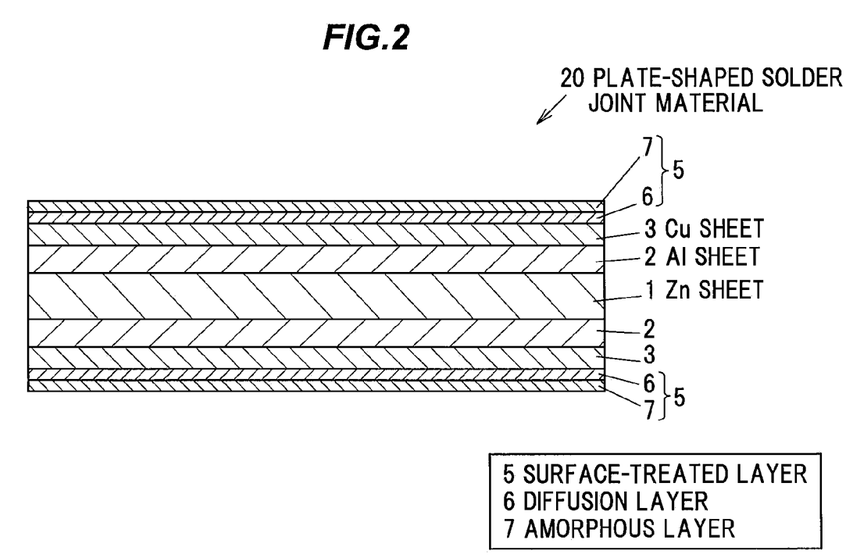
FIG. 2 is a schematic cross sectional view showing a solder joint material in a second embodiment of the invention.

FIG. 1 is a schematic cross sectional view showing a solder joint material in the first embodiment of the invention and FIG. 2 is a schematic cross sectional view showing a solder joint material in the second embodiment of the invention.

A plate-shaped solder joint material 10 shown in FIG. 1 has the same configuration as that shown in FIG. 4 of JP-A 2012-71347 mentioned above except having a surface-treated layer 4, and is a laminated material provided with a Zn-based metal material 1 (hereinafter, sometimes simply referred as "Zn sheet") located in the middle, Al-based metal materials 2 (hereinafter, sometimes simply referred as "Al sheet") provided on both sides thereof, Cu-based metal materials 3 (hereinafter, sometimes simply referred as "Cu sheet") provided respectively on the Al-based metal materials 2 and surface-treated layers 4 provided respectively on the Cu-based metal materials 3.

The Zn sheet 1 contains Zn as a major component (the component contained in the largest amount, the same applies hereinafter) which is preferably contained in an amount of not less than 90 mass %. That is, Zn alone or a Zn alloy containing not more than 10 mass % of impurities is preferable.

The Al sheet 2 contains Al as a major component which is preferably contained in an amount of not less than 90 mass %. That is, Al alone or an Al alloy containing not more than 10 mass % of impurities is preferable.

The Cu sheet 3 contains Cu as a major component which is preferably contained in an amount of not less than 90 mass %. That is, Cu alone or a Cu alloy containing not more than 10 mass % of impurities is preferable. It is possible to use, e.g., pure copper such as oxygen-free copper or tough pitch copper, or dilute-copper alloys containing 3 to 15 mass ppm of sulfur, 2 to 30 mass ppm of oxygen and 5 to 55 mass ppm of Ti.

The five-layer structure of Cu/Al/Zn/Al/Cu is desirably not less than 20 µm in total thickness for the purpose of sufficiently producing a liquid phase at the time of fusing and thereby improving wetting. In addition, the total thickness of the five-layer structure is desirably not more than 300 µm in order to reduce thermal resistance at a joint portion and to ensure reliability.

(Total thickness of Al layers)/(Thickness of Zn layer) is desirably from $1/60$ to $1/3$. In addition, a Al/Zn/Al layer thickness ratio is desirably Al:Zn:Al=1:6:1 to 1:60:1 so that the entire laminated material is uniformly melted in a bonding temperature range of 382 to 420° C. Furthermore, the ratio in the range of Al:Zn:Al=1:8:1 to 1:30:1 is more desirable from the viewpoint of uniformity of melt texture.

Meanwhile, Cu needs to have a certain thickness or more so as to exert a function of preventing oxidation of Al and Zn. While Cu is to be dissolved in a Zn—Al alloy formed by reaction and melting of Zn and Al and forms a Zn—Al—Cu alloy, it is desirable to minimize the effect of the Cu element on the hardness or melting point of the Zn—Al alloy. Thus, Cu needs to be thinner than Zn and Al. A layer thickness ratio is desirably (Al+Zn+Al):(Cu+Cu)=1:0.0002 to 1:0.2, more desirably, 1:0.0005 to 1:0.1.

The surface-treated layer 4 has an amorphous layer containing oxygen and a metal with a higher oxygen affinity than copper. Alternatively, the surface-treated layer 4 may have an amorphous layer containing oxygen, a metal with a higher oxygen affinity than copper and copper diffused from the Cu sheet 3.

The surface-treated layer may be a surface-treated layer 5 having an amorphous layer 7 and a diffusion layer 6 which is formed thereunder and contains copper and a metal with a higher oxygen affinity than copper, or oxygen, copper and a metal with a higher oxygen affinity than copper, as is the second embodiment (a plate-shaped solder joint material 20) shown in FIG. 2. The diffusion layer 6 is different from the amorphous layer 7 in that it is a crystalline layer.

The metal with a higher oxygen affinity than copper, which constitutes the surface-treated layer 4 (amorphous layer) and the amorphous layer 7, is preferably zinc. Besides zinc, it is possible to use, e.g., Ti, Mg, Zr, Al, Fe, Sn and Mn, etc. Ti, Mg and Zr, which are easily oxidized and removed at the time of manufacturing copper, are particularly preferable from the viewpoint of recycling. The same applies to the metal with a higher oxygen affinity than copper, which constitutes the diffusion layer 6, and it is preferable to use the same metal as the metal with a higher oxygen affinity than copper, which constitutes the amorphous layer.

The amorphous layer with randomly-arranged elements is considered to have a denser structure than a crystalline layer with regularly-arranged elements. Therefore, copper diffusion to the surface of the surface-treated layer and oxygen ingress into a copper raw material, which cause oxidation of the copper raw material, are suppressed or reduced by the amorphous layer. It is believed that the amorphous layer thereby serves as a barrier layer which inhibits bonding between copper and oxygen.

Oxygen needs to preferentially bond to a metal other than copper so that the amorphous layer is formed. Then, in order to accelerate the formation of the amorphous layer, it is preferable that a metal with a higher oxygen affinity than copper (e.g., zinc) be arranged on the surface of the Cu sheet 3.

Different types of elements are in contact with each other at an interface between the surface-treated layers 4 and 5 and another layer and a gradual concentration change is generally seen at such an interface, which makes difficult to define the thickness of the surface-treated layer. Therefore, the thickness of the surface-treated layer in the invention is defined as "a thickness of a layer which contains oxygen, a metal with a higher oxygen affinity than copper and, in some cases, copper, and in which each of the constituent elements is contained in the amount of not less than 2 at % in terms of atomic concentration (at %) as an elemental content ratio".

The thickness of the surface-treated layer 4 is preferably not less than 3 nm and not more than 100 nm depending on the heat treatment conditions, more preferably not less than 5 nm and not more than 70 nm, and further preferably not less than 6 nm and not more than 50 nm. Meanwhile, the thickness of the surface-treated layer 5 is preferably not less than 6 nm and not more than 100 nm as the total of the thickness of the diffusion layer 6 and the thickness of the amorphous layer 7.

When the diffusion layer 6 is provided, the lower limit of the thickness thereof is not specifically limited as long as the Cu sheet 3 is covered, and the lower limit of coating thickness is preferably about 3 nm in effect. In addition, the upper limit of the thickness of the diffusion layer 6 is preferably not more than 80 nm. When the diffusion layer 6 is more than 80 nm, the amorphous layer 7 contributing to develop high corrosion resistance may be stabilized and become less likely to be formed. The thickness of the amorphous layer 7 is not specifically limited but is preferably not less than 3 nm.

Method of Manufacturing Solder Joint Material

Next, a method of manufacturing plate-shaped solder joint materials in the first and second embodiments will be described. The five-layer structure of Cu/Al/Zn/Al/Cu can be manufactured by the manufacturing method described in JP-A 2012-71347 and the explanation thereof will be thus omitted.

The five-layer structure of Cu/Al/Zn/Al/Cu is made. Then, in case that a metal with a higher oxygen affinity than copper is, e.g., zinc, Zn layers are formed on the surfaces of the Cu sheets 3 by electrolytic plating in size and shape of the finished product. By subsequent heating in the ambient air at a temperature of not less than 30° C. and not more than 300° C. for not less than 5 seconds and not more than 60 minutes, the surface-treated layers 4 (amorphous layers) are formed. The thickness of the Zn layer is preferably not less than 3 nm and not more than 100 nm, more preferably not less than 5 nm and not more than 70 nm, and further preferably not less than 6 nm and not more than 50 nm. A plate-shaped solder joint material provided with the surface-treated layer 4 having the amorphous layer containing at least zinc and oxygen is thus obtained. In other words, it is possible to form the surface-treated layer 4 (amorphous layer) on the surface of the Cu sheet 3 by a simple method in which a zinc cover layer is simply provided and heat-treated under the predetermined conditions.

In the method of manufacturing the plate-shaped solder joint material of the invention, the cover layer is heat-treated preferably at a temperature of not less than 30° C. and not more than 300° C. for not less than 5 seconds and not more than 60 minutes as described above, more preferably at a temperature of not less than 40° C. and not more than 150° C. for not less than 20 seconds and not more than 30 minutes, and further preferably at a temperature of not less than 50° C. and not more than 100° C. for not less than 30 seconds and not more than 15 minutes. In addition, a plating process can be suitably used for forming the Zn layer. In addition to the plating process, it is possible to use a sputtering method, a vacuum deposition method and a cladding process, etc.

Alternatively, as a manufacturing method in another embodiment, the surface-treated layer 4 (amorphous layer) may be formed by preliminarily plating zinc before processing into the size and shape of the finished product and heat-treating after processing into the size and shape of the finished product.

Meanwhile, the diffusion layer 6 can be formed by, e.g., covering the surface of the Cu sheet 3 with zinc before forming the amorphous layer 7 of the surface-treated layer 5 and then heating in the ambient air or holding in an oil bath or salt bath at a temperature of not less than 50° C. Alternatively, the diffusion layer 6 may be manufactured using electric resistance heat. After that, the amorphous layer 7 is formed on the surface of the diffusion layer 6 by the same method as that used for forming the surface-treated layer 4 (amorphous layer).

Third and Fourth Embodiments

Solder joint materials in the third and fourth embodiments of the invention have a wire-like shape in which the Al-based metal layer covers an outer periphery of the Zn-based metal wire having a circular cross section, the Cu-based metal layer covers an outer periphery of the Al-based metal layer and the surface-treated layer covers an outer periphery of the Cu-based metal layer.

Figure 3:
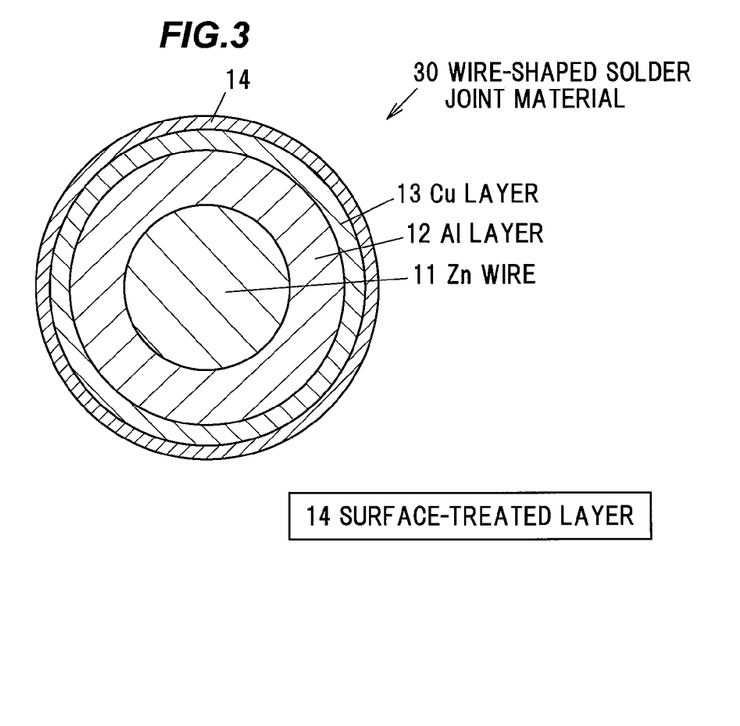
FIG. 3 is a schematic cross sectional view showing a solder joint material in a third embodiment of the invention.
Figure 4:
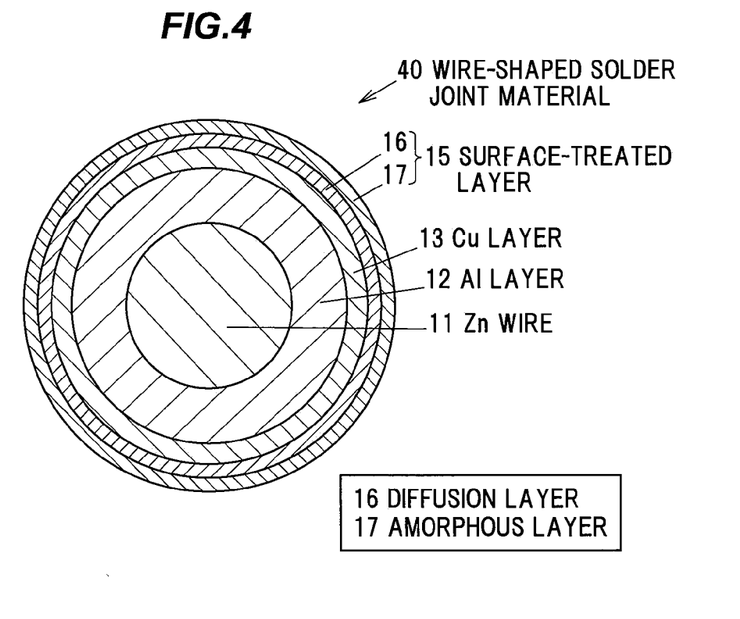
FIG. 4 is a schematic cross sectional view showing a solder joint material in a fourth embodiment of the invention.

FIG. 3 is a schematic cross sectional view showing a solder joint material in the third embodiment of the invention and FIG. 4 is a schematic cross sectional view showing a solder joint material in the fourth embodiment of the invention.

A wire-shaped solder joint material 30 shown in FIG. 3 is provided with a Zn-based metal wire 11 (hereinafter, sometimes simply referred as "Zn wire"), an Al-based metal layer 12 (hereinafter, sometimes simply referred as "Al layer") covering the outer periphery of the Zn wire 11, a Cu-base metal layer 13 (hereinafter, sometimes simply referred as "Cu layer") covering the outer periphery of the Al-based metal layer 12 and a surface-treated layer 14 covering the outer periphery of the Cu-base metal layer 13.

The surface-treated layer may be a surface-treated layer 15 having an amorphous layer 17 and a diffusion layer 16 which is formed thereunder and contains copper and a metal with a higher oxygen affinity than copper, or oxygen, copper and a metal with a higher oxygen affinity than copper, as is the fourth embodiment (a wire-shaped solder joint material 40) shown in FIG. 4.

The materials of the Zn wire 11, the Al layer 12, the Cu layer 13, the surface-treated layer 14, the diffusion layer 16 and the amorphous layer 17 are respectively the same as the materials of the Zn sheet 1, the Al sheet 2, the Cu sheet 3, the surface-treated layer 4, the diffusion layer 6 and the amorphous layer 7 in the first embodiment.

The thickness of the Al layer 12 is preferably 1/80 to 1/15, more preferably 1/55 to 1/18, of the diameter of the Zn wire 11. The thickness of the Cu layer 13 is preferably not more than 1/45, more preferably not more than 1/90, of the diameter of the Zn wire 11.

The thicknesses of the surface-treated layers 14 and 15 are the same as those of the surface-treated layers 4 and 5 in the first embodiment. Also, the thicknesses of the diffusion layer 16 and the amorphous layer 17 are the same as those of the diffusion layer 6 and the amorphous layer 7 in the first embodiment.

Although FIGS. 3 and 4 show the embodiments in which the cross section is a circular shape, it is not limited thereto. Various embodiments, e.g., an oval shape or a rectangular shape, etc., can be implemented.

Method of Manufacturing Solder Joint Material

Next, a method of manufacturing wire-shaped solder joint materials in the third and fourth embodiments will be described. The Al layer 12 is formed on the outer periphery of the Zn wire 11 and the Cu layer 13 is further formed on the Al layer 12. The formation method is, e.g., sputtering or vapor deposition as is described in JP-A 2012-71347. After that, a Zn layer is formed on the Cu layer 13 by electrolytic plating and heat treatment is performed by the same method as that used for forming the surface-treated layer 4 (amorphous layer), thereby forming the surface-treated layer 14 (amorphous layer). The method of forming the surface-treated layer 15 (the diffusion layer 16 and the amorphous layer 17) is the same as that used for forming the surface-treated layer 5 (the diffusion layer 6 and the amorphous layer 7). The wire-shaped solder joint materials 30 and 40 can be manufactured by these processes.

Intended Use

The high-temperature Pb-free solder joint materials in the embodiments of the invention can be used as a die-bonding material for semiconductor devices having various structures, a lead material, a sealing material and a joint material for insulating substrates. Examples of the application include diodes for alternator, IGBT modules, front-end modules such as RF modules, vehicle power modules, LEDs, MOSFETs for protective circuit of lithium-ion battery and ceramic substrates such as DBC substrates or DBA substrates. In addition, it is applicable as a brazing filler metal to be laminated on an Al alloy of aluminum brazing sheet used for vehicle heat exchanger, etc.

Effects of the Embodiments

In the embodiments of the invention, oxidation resistance is imparted since the surface-treated layer 4, 5, 14 or 15, which serves as a barrier layer for suppressing or reducing copper diffusion to the surface of the surface-treated layer and oxygen ingress into the Cu metal material, is formed on the surface of a joint material having a predetermined layer structure, this allows growth of an oxide film on the surface of the Cu-based metal material to be suppressed during storage, and it is thereby possible to provide a high-temperature Pb-free solder joint material not requiring soldering in an atmosphere which reduces a Cu oxide film. Since it is not necessary to solder in a reducing atmosphere, work efficiency of soldering is improved. In addition, it is possible to reduce the cost and to improve safety of work environment since it is not necessary to use hydrogen or formic acid.

The following examples further illustrate the invention but the invention is not limited thereto.

EXAMPLES

Samples corresponding to only the Cu-based metal material (Cu sheet) and the surface-treated layer on the Cu-based metal material in the solder joint material of the invention were made and evaluated. In this regard, the Cu sheets thicker than a preferable Cu thickness of the five-layer structure of Cu/Al/Zn/Al/Cu were used for the evaluation. Table 1 shows the configurations of the samples in Examples 1 to 5 and Comparative Examples 1 to 5. Table 1 also shows the evaluation results of the evaluation items described later.

The samples in Examples 1 to 5 shown in Table 1 were generally made as follows: a cover layer formed of zinc plating with various thickness (0.002 to 0.08 μm) was formed on a flat sheet formed of tough pitch copper by electrolytic plating and annealing was then performed in the ambient air. The details of Examples 1 to 5 and Comparative Examples 1 to 5 will be described later Meanwhile, in Comparative Example 1 for evaluating influence of the thickness of the zinc layer on the characteristics of the Cu-based metal material (Cu sheet), a zinc layer with a different thickness was formed and heat treatment was then performed in the same manner as Example 1. In Comparative Examples 2 and 3 for evaluating influence of the heat treatment conditions on the characteristics of the Cu-based metal material (Cu sheet), the sample was made under a different heat treatment condition (Comparative Example 2) or was made without heat treatment (Comparative Example 3).

Furthermore, as the samples of Comparative Examples 4 and 5, tough pitch copper (Comparative Example 4) and a Cu-30 mass % Zn alloy (Comparative Example 5) were prepared.

Presence of the amorphous layer shown in Table 1 was confirmed by RHEED analysis (Reflection High Energy Electron Diffraction). The samples showing a halo pattern indicating presence of the amorphous layer are indicated by "Present", and the samples showing electron diffraction spots indicating a crystalline structure are indicated by "Not present".

Here, appearance evaluation, corrosion resistance evaluation and overall evaluation of the obtained samples shown in Table 1 were performed as follows.

For evaluating "appearance", a constant temperature test to hold samples in a constant-temperature oven set at 100° C. for up to 1000 hours and a 100-hour holding test in a test chamber at a temperature of 85° C. and humidity of 85% were conducted. Using change in color and gloss before and after the tests as criteria for judgment, the samples with the least change were evaluated as "⊚ (excellent)", the samples with the most significant change and with associated deterioration in appearance were evaluated as "x (bad)", and the samples with the change in-between were evaluated as either "○ (acceptable)" or "Δ (unacceptable)".

For evaluating "oxidation resistance", each sample was kept in the ambient air in a constant-temperature oven set at 100° C. for up to 1000 hours and an increase in oxide film was measured after the test. Based on comparison with the initial thickness (before the test) of the oxide film, the samples with the least change were evaluated as "⊚ (excellent)", the

TABLE 1

|  |  |  | Surface-treated layer | | | Evaluation results | | | |
| --- | --- | --- | --- | --- | --- | --- | --- | --- | --- |
|  |  | Sheet material | Material | thickness (μm) | Presence of amorphous layer | Appearance (color, gloss) | | Oxidation resistance | Overall Evaluation |
|  |  |  |  |  |  | 100° C. | 85° C. × 85% |  |  |
| Examples | 1 | Cu | Zn | 0.003 | present | ○ | ○ | ○ | ○ |
|  | 2 | Cu | Zn | 0.006 | present | ⊚ | ⊚ | ⊚ | ⊚ |
|  | 3 | Cu | Zn | 0.01 | present | ⊚ | ⊚ | ⊚ | ⊚ |
|  | 4 | Cu | Zn | 0.05 | present | ⊚ | ⊚ | ⊚ | ⊚ |
|  | 5 | Cu | Zn | 0.1 | present | ○ | ○ | ○ | ○ |
| Comparative Examples | 1 | Cu | Zn | 1.0 | not present | X | X | X | X |
|  | 2 | Cu | Zn | 0.02 | not present | Δ | X | Δ | X |
|  | 3 | Cu | Zn | 0.02 | not present | X | X | X | X |
|  | 4 | Cu | — | — | not present | X | X | X | X |
|  | 5 | Cu—Z alloy | — | — | not present | Δ | Δ | Δ | X | samples with the most significant change and with associated deterioration were evaluated as "x (bad)", and the samples with the change in-between were evaluated as either "○ (acceptable)" or "Δ (unacceptable)" depending on the extent of the change. Using comparison results with the initial thickness (before the test) of the oxide film as quantitative criteria, the samples of which oxide film after 1000 hours has a thickness three times or more were all evaluated as "x" regardless of the change in appearance.

For "overall evaluation", the results of the above items were comprehensively assessed, and ⊚ and ○ are judged as "passed the test" and Δ and x were judged as "failed the test".

The details of Examples 1 to 5 and Comparative Examples 1 to 5 are described below.

Example 1

A 0.5 mm-thick flat sheet formed of pure copper (tough pitch copper; hereinafter, described as "TPC") was prepared, a 0.002 μm-thick cover layer formed of zinc was then formed on a surface of the flat sheet by electrolytic plating and heat treatment was subsequently performed in the ambient air at a temperature of 50° C. for 10 minutes, thereby obtaining a sample provided with a surface-treated layer. Based on Auger analysis performed on the obtained sample from the surface in a depth direction, it was confirmed that a 0.003 μm-thick surface-treated layer composed of zinc (Zn), oxygen (O) and copper (Cu) was formed.

Example 2

In Example 2, a 0.5 mm-thick flat sheet formed of TPC was prepared, a 0.005 μm-thick Zn layer was then formed on a surface of the flat sheet by electrolytic plating and heat treatment was subsequently performed in the ambient air at a temperature of 50° C. for 1 hour, thereby obtaining a sample. Based on Auger analysis performed on the obtained sample from the surface in a depth direction, it was confirmed that a 0.006 μm-thick surface-treated layer composed of zinc (Zn), oxygen (O) and copper (Cu) was formed.

Example 3

In Example 3, a 0.5 mm-thick flat sheet formed of TPC was prepared, a 0.008 μm-thick Zn layer was then formed on a surface of the flat sheet by electrolytic plating and heat treatment was subsequently performed in the ambient air at a temperature of 100° C. for 5 minutes, thereby obtaining a sample. Based on Auger analysis performed on the obtained sample from the surface in a depth direction, it was confirmed that a 0.01 μm-thick surface-treated layer composed of zinc (Zn), oxygen (O) and copper (Cu) was formed.

Example 4

In Example 4, a 0.5 mm-thick flat sheet formed of TPC was prepared, a 0.04 μm-thick Zn layer was then formed on a surface of the flat sheet by electrolytic plating and heat treatment was subsequently performed in the ambient air at a temperature of 120° C. for 10 minutes, thereby obtaining a sample. Based on Auger analysis performed on the obtained sample from the surface in a depth direction, it was confirmed that a 0.05 μm-thick surface-treated layer composed of zinc (Zn), oxygen (O) and copper (Cu) was formed.

Example 5

In Example 5, a 0.5 mm-thick flat sheet formed of TPC was prepared, a 0.08 μm-thick Zn layer was then formed on a surface of the flat sheet by electrolytic plating and heat treatment was subsequently performed in the ambient air at a temperature of 300° C. for 5 seconds, thereby obtaining a sample. Based on Auger analysis performed on the obtained sample from the surface in a depth direction, it was confirmed that a 0.1 μm-thick surface-treated layer composed of zinc (Zn), oxygen (O) and copper (Cu) was formed.

Comparative Example 1

In Comparative Example 1, a 0.5 mm-thick flat sheet formed of TPC was prepared, a 0.95 μm-thick Zn layer was then formed on a surface of the flat sheet by electrolytic plating and heat treatment was subsequently performed in the ambient air at a temperature of 100° C. for 5 minutes, thereby obtaining a sample. Based on Auger analysis performed on the obtained sample from the surface in a depth direction, it was confirmed that a 1 μm-thick surface-treated layer composed of zinc (Zn) and oxygen (O) was formed.

Comparative Example 2

In Comparative Example 2, a 0.5 mm-thick flat sheet formed of TPC was prepared, a 0.01 μm-thick Zn layer was then formed on a surface of the flat sheet by electrolytic plating and heat treatment was subsequently performed in the ambient air at a temperature of 400° C. for 60 seconds, thereby obtaining a sample. Based on Auger analysis performed on the obtained sample from the surface in a depth direction, it was confirmed that a 0.02 μm-thick surface-treated layer composed of zinc (Zn), oxygen (O) and copper (Cu) was formed.

Comparative Example 3

In Comparative Example 3, a 0.5 mm-thick flat sheet formed of TPC was prepared and a 0.02 μm-thick Zn layer was then formed on a surface of the flat sheet by electrolytic plating, thereby obtaining a sample.

Comparative Example 4

In Comparative Example 4, a 0.5 mm-thick flat sheet formed of TPC was used as an evaluation sample.

Comparative Example 5

In Comparative Example 5, a 0.5 mm-thick flat sheet formed of Cu-30 mass % Zn alloy (brass) was used as an evaluation sample.

Figure 5:
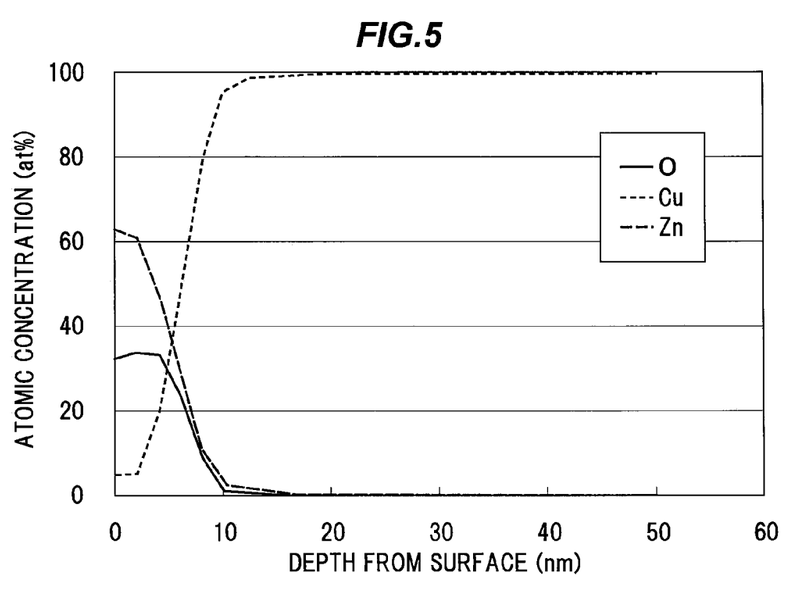
FIG. 5 is a graph showing the results of Auger elemental analysis performed on a sample in Example 3 of the invention, where the sample after 3600 hours of a constant temperature test (at 100° C.) is analyzed from the surface in a depth direction while repeating sputtering.

FIG. 5 is a graph showing the results of Auger elemental analysis performed on the sample in Example 3, where the sample after 3600 hours of a constant temperature test (at 100° C.) is analyzed from the surface in a depth direction while repeating sputtering. The horizontal axis indicates a depth (nm) from the surface and the vertical axis indicates an atomic concentration (at %). Then, a solid line shows the atomic concentration (at %) as the ratio of the oxygen content, a long-dashed line shows the atomic concentration of zinc and a short-dashed line shows the atomic concentration of copper. The oxygen penetration depth was about 8 nm from the surface, and the average elemental content of each element particularly in the surface portion at a depth of 0 to 3 nm, which is defined as [the maximum atomic concentration+the minimum atomic concentration (at the depth of 0 to 3 nm)]/2, was 60 at % for zinc (Zn), 33 at % for oxygen (O) and 7 at % for copper (Cu) in Example 3.

In addition, based on the results including other Examples, it was found that the average elemental content of zinc (Zn) was in a range of 35 to 68 at %, that of oxygen (O) in a range of 30 to 60 at % and that of copper (Cu) in a range of 0 to 15 at %.

On the other hand, the sample in Comparative Example 1 contained 33 at % of zinc (Zn), 41 at % of oxygen (O) and 26 at % of copper (Cu), and the sample in Comparative Example 5 contained 5 at % of zinc (Zn), 46 at % of oxygen (O) and 49 at % of copper (Cu).

Figure 6:
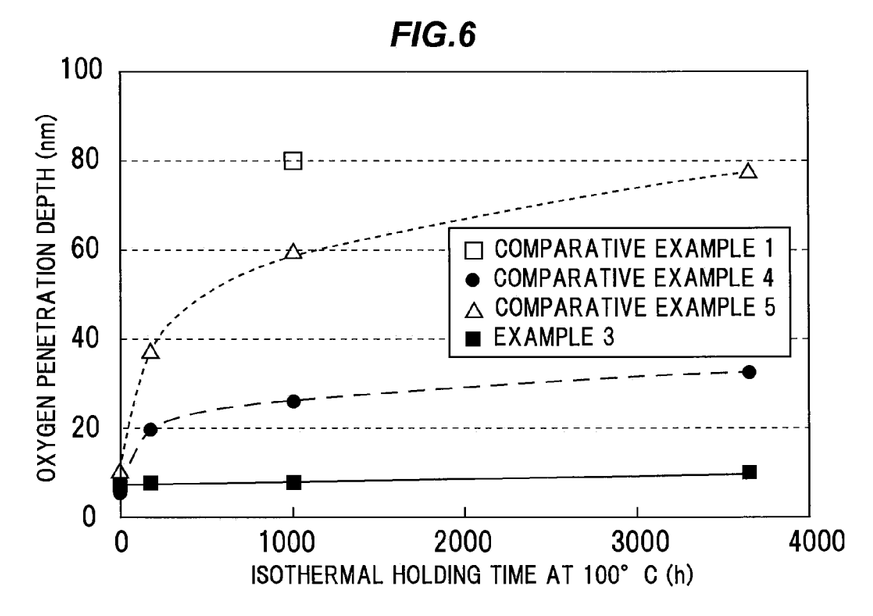
FIG. 6 is a graph showing time-dependent change in an oxygen penetration depth from the surface layer (thickness of oxide film) in the constant temperature test (at 100° C.) conducted on samples in Example 3 of the invention and Comparative Examples 1, 4 and 5.

FIG. 6 is a graph showing time-dependent change in an oxygen penetration depth from the surface layer (thickness of oxide film) in the constant temperature test (at 100° C.) conducted on the samples in Example 3 and Comparative Examples 1, 4 and 5. The oxygen penetration depth was derived by Auger analysis performed on the samples held for various periods of time from the surface in a depth direction while repeating sputtering. In FIG. 6, the horizontal axis indicates isothermal holding time (h) at 100° C. and the vertical axis indicates the oxygen penetration depth (nm). Then, a solid line shows oxygen penetration depth in Example 3 and dashed lines show the oxygen penetration depth in Comparative Example 4 and that in Comparative Example 5. Comparative Example 1 is indicated by a single point.

In Example 3, as shown in FIG. 5, the oxygen concentration in the vicinity of the surface increased after holding 3600 hours but the penetration depth of oxygen hardly changed before and after the test and was about not more than 0.01 μm, which shows that the sample in Example 3 has high oxidation resistance.

Meanwhile, as shown in FIG. 6, a thickness of an oxygen-containing layer before the constant temperature test was about 0.006 μm from the surface in both Comparative Example 4 (tough pitch copper) and Comparative Example 5, which is comparable to the depth before the test in Example 3. However, after the 3600 hours of the holding test, the oxygen concentration in the vicinity of the surface in Comparative Example 4 significantly increased as compared to that before the constant temperature test, and also, the oxygen penetration depth in Comparative Example 4 was about 0.036 μm which is 5 times or more of that before the test and the oxygen penetration depth in Comparative Example 5 was about 0.078 μm which is 13 times that before the test. In addition, in Comparative Examples 4 and 5, reddish brown discoloration was observed on the appearance after the test and it was obvious that a thick oxygen-containing layer was formed. In addition, in Comparative Examples 1 in which a 0.95 μm-thick Zn layer is formed on TPC, the oxygen penetration depth already reached about 0.080 μm after 1000 hours of the holding test.

Figure 7:
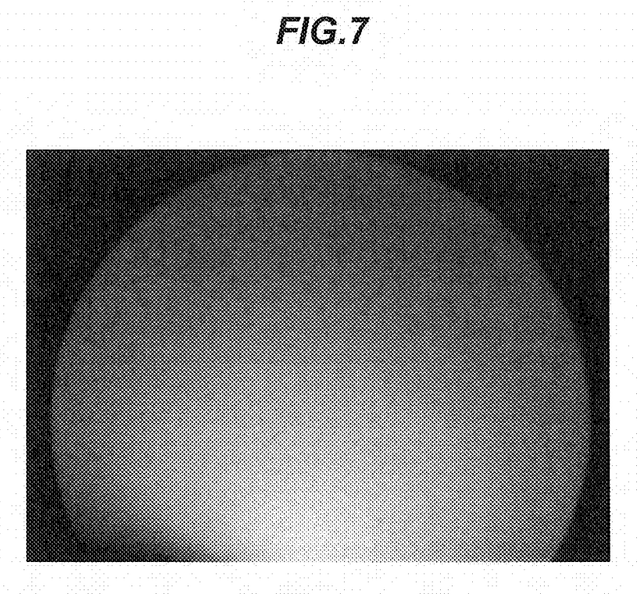
FIG. 7 is an electron diffraction image showing the result of RHEED analysis performed on the sample in Example 3 of the invention.

FIG. 7 shows the result of RHEED analysis performed on the surface of the sample in Example 3 which is excellent in oxidation resistance. A halo pattern is shown in the electron diffraction image and this reveals that an amorphous layer is formed on the surface as shown in Table 1. On the other hand, it was confirmed that the sample in Comparative Example 4 having less oxidation resistance was a crystalline substance composed of copper and oxygen.

In addition, according to Table 1, in Examples 1 to 5 in which surface-treated layers with various thicknesses of 0.003 to 0.1 μm are respectively provided and each have an amorphous structure, good results were obtained from the evaluations of appearance and oxidation resistance. Excellent characteristics were exhibited especially when the thickness of the surface-treated layer was 0.006 to 0.05 μm.

From the above results, it was confirmed that, in the structures of Examples 1 to 5, the process of oxidation does not occur and a stable surface condition is maintained even in the constant temperature test at 100° C. for 1000 hours and also under the environment of 85° C.×85%.

On the other hand, satisfactory characteristics were not obtained in some cases in Comparative Examples 1 to 3 even though a Zn-based surface-treated layer is provided in the same manner. The evaluation result of oxidation resistance is "Fail" for all of the samples in which an amorphous surface layer was not formed, such as Comparative Example 1 with thick zinc, Comparative Example 2 with excessive heat treatment after plating and Comparative Example 3 with no heat treatment after plating.

As for the cost performance (economic performance), Examples 1 to 5 do not require coating of noble metal excellent in oxidation resistance of material per se but expensive, uses cheap Zn with very small thickness, and are thus extremely excellent in productivity and economic performance.

Next, plate-shaped solder joint materials were made and then evaluated.

Each five-layer structure having the total thickness of 200 μm was made so that the layer thicknesses of Cu/Al/Zn/Al/Cu were respectively 2 μm/16 μm/164 μm/16 μm/2 μm. The same surface treatment as that used in Examples 1 to 5 and Comparative Examples 1 to 3 was performed on the surfaces of both Cu layers of each five-layer structure, thereby obtaining plate-shaped solder joint materials in Examples 6 to 10 and Comparative Examples 6 to 8. In addition, a plate-shaped solder joint material in Comparative Example 9 was made without surface treatment and that in Comparative Example 10 was made using a Cu—Zn alloy for the outermost layer.

Each sample for bondability evaluation was made by joining a 5 mm-square Si chip to a Cu frame using a 5.5 mm-square plate-shaped solder joint material of Examples 6 to 10 and Comparative Examples 6 to 10. The Si chip and the Cu frame which are metalized with Ni or Ni/Ag or Ni/Au were used. The bonding conditions were a bonding temperature of not less than 385° C., bonding time of not less than 2 minutes and a load of not less than 1 g. For the purpose of comparison, an ambient air and a $N_2$+4% $H_2$+100 ppm$O_2$ atmosphere were used as the bonding atmosphere.

The bondability was evaluated by ultrasonic flaw detection. The samples with a void fraction of less than 10% were determined as "○ (passed the test)", and the samples with a void fraction of not less than 10% were determined as "x (failed)". The reason for using void as an evaluation criterion is that presence of voids causes cracks to be preferentially developed therearound when stress is applied and this has a great impact on reliability.

TABLE 2

| | | Bonding atmosphere | |
|---|---|---|---|
| | | Ambient air | $N_2$ + 4% $H_2$ + 100 ppm $O_2$ |
| Examples | 6 | ○ | ○ |
| | 7 | ○ | ○ |
| | 8 | ○ | ○ |
| | 9 | ○ | ○ |
| | 10 | ○ | ○ |
| Comparative Examples | 6 | X | X |
| | 7 | X | X |
| | 8 | X | X |
| | 9 | X | ○ |
| | 10 | X | X |

As a result of evaluating bondability of Examples 6 to 10, a satisfactory void fraction of less than 10% was obtained in both the ambient air and the $N_2$+4% $H_2$+100 ppm$O_2$ atmosphere. It is considered that this is because the surface-treated layer (amorphous layer) suppressed oxidation.

In Comparative Examples 6 to 8, the void fraction was not less than 10% in the both atmospheres. This is because the outermost surface was Zn since the Zn layer as the outermost layer was thick and oxidation of the Zn formed a film on the surface, which inhibited wetting.

In Comparative Example 9, a satisfactory joint with the void fraction of less than 10% was obtained in the $N_2$+4% $H_2$+100 ppm$O_2$ atmosphere but the void fraction was not less than 10% in the ambient air. This is because, while satisfactory wetting was obtained in the $N_2$+4% $H_2$+100 ppm$O_2$ atmosphere since the oxidized Cu was reduced, a film was formed on the surface in the ambient air due to oxidation of Cu and this inhibited wetting.

In Comparative Example 10, the void fractions in the both atmospheres were better than those of Comparative Examples 6 to 8 but were still not less than 10%. This is because the Zn component in the Cu—Zn alloy was oxidized and a film was formed on the Zn, which inhibited wetting.

It should be noted that the invention is not intended to be limited to the embodiments and the examples, and various kinds of modifications can be implemented.

What is claimed is:

1. A solder joint material, consisting essentially of:
    a Zn-based metal material;
    an Al-based metal material provided on the Zn-based metal material;
    a Cu-based metal material provided on the Al-based metal material; and
    an outermost surface-treated layer provided on the Cu-based metal material, the outermost surface-treated layer consisting essentially of
        an amorphous layer consisting essentially of oxygen, a first metal having a higher oxygen affinity than copper, and optionally copper diffused from the Cu-based metal material, wherein a portion of metal atoms of the first metal are bonded to the oxygen, and
        optionally a diffusion layer disposed between the Cu-based metal material and the amorphous layer, the diffusion layer consisting essentially of copper and a second metal having a higher oxygen affinity than copper, and optionally oxygen, wherein the first metal and the second metal are the same or different, and
    wherein a diffraction image of electrons shows a halo pattern by reflection high energy electron diffraction.

2. The solder joint material according to claim 1, wherein the solder joint material is plate-shaped,
    the Zn-based metal material has opposing first and second sides, and
    the Al-based metal material, the Cu-based metal material, and the outermost surface-treated layer, are provided on one or more of the first side and the second side of the Zn-based metal material.

3. The solder joint material according to claim 1, wherein the solder joint material is
    wire-shaped, and
    the Al-based metal material covers an outer periphery of the Zn-based metal material, the Cu-based metal material covers an outer periphery of the Al-based metal material, and the outermost surface-treated layer covers an outer periphery of the Cu-based metal material.

4. The solder joint material according to claim 1, wherein the outermost surface-treated layer consists essentially of the amorphous layer.

5. The solder joint material according to claim 1, wherein the surface-treated layer consists essentially of the amorphous layer and the diffusion layer.

6. The solder joint material according to claim 1, wherein one or more of the first metal and the second metal having a higher oxygen affinity than copper is zinc.

7. The solder joint material according to claim 1, wherein the surface-treated layer has a thickness of not less than 3 nm and not more than 100 nm.

8. The solder joint material according to claim 1, wherein
    the Zn-based metal material contains Zn or a Zn alloy in an amount of not less than 90 wt % based on the weight of the Zn-based metal material,
    the Al-based metal material contains Al or an Al alloy in an amount of not less than 90 wt % based on the weight of the Al-based metal material, and
    the Cu-based metal material contains Cu or a Cu alloy in an amount of not less than 90 wt % based on the weight of the Cu-based metal material.

9. The solder joint material, of claim 1, wherein the oxygen contained in the amorphous layer is present at an atomic concentration of from 30 to 60 at %.

10. The solder joint material according to claim 5, wherein the diffusion layer is a crystalline layer.

11. A solder joint material, consisting of:
    a Zn-based metal material;
    an Al-based metal material provided on the Zn-based metal material;
    a Cu-based metal material provided on the Al-based metal material; and
    an outermost surface-treated layer provided on the Cu-based metal material, the outermost surface-treated layer consisting of
        an amorphous layer consisting of oxygen present at an atomic concentration of from 30 to 60 at %, a first metal having a higher oxygen affinity than copper, and optionally copper diffused from the Cu-based metal material, wherein a portion of metal atoms of the first metal are bonded to the oxygen, and
        optionally a diffusion layer disposed between the Cu-based metal material and the amorphous layer, the diffusion layer consisting of copper and a second metal having a higher oxygen affinity than copper, and optionally oxygen, wherein the first metal and the second metal are the same or different, and
    wherein a diffraction image of electrons shows a halo pattern by reflection high energy electron diffraction.

12. The solder joint material according to claim 11, wherein the outermost surface-treated layer consists of the amorphous layer.

13. The solder joint material according to claim 11, wherein the outermost surface-treated layer consists of the amorphous layer and the diffusion layer, wherein the diffusion layer is a crystalline layer.

14. The solder joint material according to claim 11, wherein the surface-treated layer has a thickness of not less than 3 nm and not more than 100 nm.

15. A solder joint material, comprising:
    a Zn-based metal material;
    an Al-based metal material provided on the Zn-based metal material;
    a Cu-based metal material provided on the Al-based metal material; and an outermost surface-treated layer provided on the Cu-based metal material, the outermost surface-treated layer comprising
an amorphous layer comprising oxygen present at an atomic concentration of from 30 to 60 at %, and a first metal having a higher oxygen affinity than copper, wherein a portion of metal atoms of the first metal are bonded to the oxygen,
wherein a diffraction image of electrons shows a halo pattern by reflection high energy electron diffraction.

16. The solder joint material according to claim 15, wherein the amorphous layer further comprises copper diffused from the Cu-based material.

17. The solder joint material according to claim 15, wherein the outermost surface-treated layer further comprises a diffusion layer disposed between the Cu-based metal material and the amorphous layer, the diffusion layer comprising copper and a second metal having a higher oxygen affinity than copper, wherein the first metal and the second metal are the same or different.

18. The solder joint material according to claim 17, wherein the diffusion layer further comprises oxygen.

19. The solder joint material according to claim 17, wherein the diffusion layer is a crystalline layer.

20. The solder joint material according to claim 15, wherein one or more of the first metal and the second metal having a higher oxygen affinity than copper, is zinc.

21. The solder joint material according to claim 17, wherein the first metal and the second metal are the same.

22. The solder joint material according to claim 21, wherein the first metal and the second metal are zinc.

23. The solder joint material according to claim 15, wherein
the Zn-based metal material contains Zn or a Zn alloy in an amount of not less than 90 wt % based on the weight of the Zn-based metal material,
the Al-based metal material contains Al or an Al alloy in an amount of not less than 90 wt % based on the weight of the Al-based metal material, and
the Cu-based metal material contains Cu or a Cu alloy in an amount of not less than 90 wt % based on the weight of the Cu-based metal material.

24. The solder joint material according to claim 23, wherein
the Zn-based metal material contains Zn in an amount of not less than 90 wt % based on the weight of the Zn-based metal material,
the Al-based metal material contains Al in an amount of not less than 90 wt % based on the weight of the Al-based metal material, and
the Cu-based metal material contains Cu in an amount of not less than 90 wt % based on the weight of the Cu-based metal material.

25. The solder joint material according to claim 15, wherein
the solder joint material is plate-shaped,
the Zn-based metal material has opposing first and second sides, and
the Al-based metal material, the Cu-based metal material, and the outermost surface-treated layer, are provided on one or more of the first side and the second side of the Zn-based metal material.

26. The solder joint material according to claim 15, wherein the solder joint material is
wire-shaped, and
the Al-based metal material is provided over an outer periphery of the Zn-based metal material, the Cu-based metal material is provided over an outer periphery of the Al-based metal material, and the outermost surface-treated layer is provided over an outer periphery of the Cu-based metal material.

27. The solder joint material according to claim 15, wherein the surface-treated layer has a thickness of not less than 3 nm and not more than 100 nm.

28. A solder joint material, comprising:
a Zn-based metal material;
an Al-based metal material provided on the Zn-based metal material;
a Cu-based metal material provided on the Al-based metal material; and
an outermost surface-treated layer provided on the Cu-based metal material, the outermost surface-treated layer comprising
an amorphous layer comprising oxygen and a first metal having a higher oxygen affinity than copper, wherein a portion of metal atoms of the first metal are bonded to the oxygen,
wherein a diffraction image of electrons shows a halo pattern by reflection high energy electron diffraction.

29. The solder joint material, of claim 28, wherein the oxygen contained in the amorphous layer is present at an atomic concentration of from 30 to 60 at %.

30. The solder joint material according to claim 28, wherein the outermost surface-treated layer further comprises a diffusion layer disposed between the Cu-based metal material and the amorphous layer, the diffusion layer comprising copper and a second metal having a higher oxygen affinity than copper, wherein the first metal and the second metal are the same or different.

* * * * *